UNITED STATES PATENT OFFICE.

LEONARD SCHADE VAN WESTRUM, OF ZURICH, SWITZERLAND.

METHOD OF MAKING ROADS.

15,401. Specification of Reissued Letters Patent. Reissued July 4, 1922.

No Drawing. Original No. 956,009, dated April 26, 1910, Serial No. 489,662, filed April 13, 1909. Application for reissue filed May 20, 1921. Serial No. 471,260.

*To all whom it may concern:*

Be it known that I, LEONARD SCHADE VAN WESTRUM, a subject of the Queen of the Netherlands, temporarily residing at Zurich, in Switzerland, and whose post-office address is 9 Gessner Allee, Zurich, have invented new and useful Improvements in Methods of Making Roads, of which the following is a specification.

My invention relates to improvements in methods of making roads, streets, public squares, road-beds of railways and other like surfaces, by means of an asphaltic cement laid cold.

Bituminous roads, streets, etc., like sheet asphalt, tar, macadam, bitulithic asphalt macadam, have hitherto usually been built in the following manner: The sand, stone, etc., have to be heated and also the bitumen, like asphalt, tar, etc., and these materials have to be mixed hot and spread hot over a given foundation. The object of heating the materials, is to drive out all of the moisture which the mineral aggregate contains, because this moisture would prevent the bitumen, asphalt, tar, etc., from coming into contact with the irregular surfaces of the mineral aggregate and no permanent binding effect would be possible.

My invention does away with heating in any form when the pavement is to be laid. The broken stone, sand, gravel or earth is used in its natural condition and the moisture therein acts as a carrying agent which sucks the bituminous material like asphalt tar, etc., into contact with the irregular surfaces of the mineral aggregate. For this purpose I liquefy hard bitumen, like natural asphalt, artificial asphalt, or the like, by heating the same and mixing it with any suitable flux, like residuum of mineral oils, or residuum of cotton seed or similar oils. In case I use a softer bitumen, like Texas, California or Kansas asphalt, which contains enough natural flux, I use these asphaltums pure, or with a smaller percentage of flux. I make these mixtures emulsifiable in water and the products thus obtained are mixed with cold stone, sand, or earth, by hand or machinery, and spread upon the roadway on a given foundation, and then compacted. The moisture in the stone will suck the emulsified asphalt cement into close contact with the irregularities of the stone and after a few hours the action of the air oxidizes the emulsified asphaltic cement and the whole mixture of stone, etc., and emulsified asphaltic cement makes a compact mass which is waterproof and hard enough to withstand any kind of traffic and yet elastic.

By "hard bitumen" I mean asphaltums, tar, etc., which are not fluid when cold.

In order to emulsify the asphalt, tar, etc., I heat the same until they are liquid, with or without addition of a suitable flux, add to them a soapy agent consisting of an acid, ricinus oil, resin oil, resin or the like and an alkali, as for example, a volatile fluid like ammonia, etc., and add so much water to the mixture that it stays fluid when cold.

In order to be suitable for road building purposes the emulsified cement must not contain more than 10 to 20 parts chemicals, acids, resin, ammonia, etc., and the proportion of asphalt, tar, etc., must be not less than 30 parts and not more than 80 parts of the whole mixture. I take for example 60 to 80 parts of Trinidad or Bermudas asphalt, mix this with 20 to 40 parts suitable flux, emulsify this mixture by adding to the hot mixture 4 parts to 8 parts of resin, 3 to 6 parts of resin oil, 2 to 4 parts red oil, and 2 to 4 parts ammonia, and 20 to 40 parts water. These materials must be thoroughly mixed so they will readily emulsify in water.

I do not limit my invention to any special process of emulsifying the bitumen, but I claim that it is novel to use as the base of my asphaltic cement hard bitumen which is not fluid when cold, in excess over fluxes and chemicals.

It is well known that emulsions of oily substances are used for dust laying purposes and it is also known through my United States Letters Patent No. 752,486, dated February 16, 1904, that mixtures of emulsified or soluble oily substances are used as binding agents for broken stone, gravel, etc., which has proven successful for dust laying purposes, but as a method of constructing a permanent waterproof pavement it has this disadvantage, that the oily substance even with the addition of an amount of liquid asphalt does not oxidize through action of the air and does not dry quickly enough to be rolled or tamped properly.

The oxidation to which I have above referred is the action which is effected by the exposure of the emulsified asphaltic cement to the air after it is properly mixed and laid which is visibly indicated by the change of the material from brown to black and which is physically marked by the cement becoming insoluble in water and incapable of emulsification, as explained in my copending application, Serial No. 288,855, filed November 24, 1905, and renewed July 13, 1907, as Serial No. 383,626, and which has since issued as Patent No. 992,313, dated May 16, 1911.

Having thus described my invention, what I claim is:

1. The method of building roads which consists in mixing with the materials constituting the mineral aggregate in their natural condition an asphaltic cement whose base is hard bitumen in excess over fluxes and chemicals, and emulsified with an agent whose basis is water, and in spreading and compacting the mixture on a suitable foundation.

2. The method of building roads, which consists in employing an asphaltic cement of which the base is a hard bitumen emulsified by a soapy agent with the bitumen in excess over fluxes and said agent, mixing this cement with a mineral aggregate in its natural condition, and spreading and compacting the mixture upon a suitable foundation.

3. The method of building roads, which consists in employing an oxidizable bituminous emulsion, comprising a bituminous cement emulsified with an agent whose basis is water; mixing this emulsion with a cold mineral aggregate; and spreading and compacting the mixture upon a suitable foundation, whereby the emulsion through action of the air, soon oxidizes and becomes insoluble in water, with production of a waterproof wearing surface.

4. A cold asphaltic cement which consists of about 60 to 80 parts of hard bitumen combined with about 20 to 40 parts of flux, emulsified by not more than 20 parts of a soapy agent and sufficient water, the hard bitumen being in excess over fluxes and chemicals.

In testimony whereof I have hereunto signed my name at Zurich, in the Republic of Switzerland, this sixteenth day of February, 1921.

LEONARD SCHADE van WESTRUM.

Witnesses:
A. Genbrantz,
R. Furnée.